United States Patent [19]

Hauxwell et al.

[11] 4,157,266

[45] * Jun. 5, 1979

[54] DISPERSION OF PIGMENT OR DYESTUFF IN ORGANIC LIQUID

[75] Inventors: Frank Hauxwell; James F. Stansfield; Arthur Topham, all of Manchester, England

[73] Assignee: Imperial Chemical Industries Limited, London, England

[*] Notice: The portion of the term of this patent subsequent to Aug. 16, 1994, has been disclaimed.

[21] Appl. No.: 727,794

[22] Filed: Sep. 29, 1976

Related U.S. Application Data

[60] Continuation of Ser. No. 531,787, Dec. 11, 1974, Pat. No. 4,042,413, which is a division of Ser. No. 330,882, Feb. 8, 1973, abandoned.

[30] Foreign Application Priority Data

Feb. 28, 1972 [GB] United Kingdom ................ 9033/72

[51] Int. Cl.$^2$ .......................... C08J 3/20; C09B 67/00; C09C 3/08; C09D 3/00
[52] U.S. Cl. ................................ 106/308 N; 106/23; 260/33.6 R; 260/33.8 R
[58] Field of Search ............................ 106/308 N, 23; 260/33.6 R, 33.8 R

[56] References Cited

U.S. PATENT DOCUMENTS

| | | | |
|---|---|---|---|
| 2,882,249 | 4/1959 | Posnansky | 260/404.5 |
| 3,022,326 | 2/1962 | Schroeder et al. | 260/404.5 |
| 3,037,947 | 6/1962 | Elkin | 260/404.5 |
| 3,045,034 | 7/1962 | Zankl et al. | 260/404.5 |
| 3,183,112 | 5/1965 | Gemassmer | 260/404.5 |
| 3,345,311 | 10/1967 | Erlich et al. | 260/404.5 |
| 3,483,150 | 12/1969 | Erlich | 260/404.5 |
| 3,560,235 | 2/1971 | Sarfas et al. | 106/308 N |
| 3,655,608 | 4/1972 | Guenther et al. | 106/308 N |
| 3,723,151 | 3/1973 | Backhouse et al. | 106/308 N |
| 3,728,301 | 4/1973 | Spence et al. | 106/308 N |
| 3,775,327 | 11/1973 | Thompson | 260/404.5 |
| 3,832,209 | 8/1974 | Baker et al. | 106/308 N |

FOREIGN PATENT DOCUMENTS

| | | |
|---|---|---|
| 820005 | 9/1959 | United Kingdom. |
| 1132821 | 11/1968 | United Kingdom. |
| 1133887 | 11/1968 | United Kingdom. |
| 1147732 | 4/1969 | United Kingdom. |
| 1162722 | 8/1969 | United Kingdom. |

Primary Examiner—Allan Lieberman
Attorney, Agent, or Firm—Cushman, Darby & Cushman

[57] ABSTRACT

Dispersing agents comprising the adducts of one or more compounds from each of the following classes:
(a) an organic compound containing two or more isocyanate groups,
(b) an organic compound containing two or more groups which are reactive with isocyanate groups, and
(c) a compound of the formula:

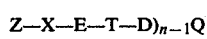

wherein
Z represents —OH or —NHR,
wherein R is a monovalent hydrocarbon radical;
X is an optionally substituted divalent hydrocarbon radical;
T is a divalent hydrocarbon radical;
n is a positive integer;
Q is an optionally substituted monovalent hydrocarbon radical;
and E is a

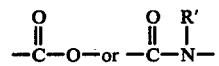

group
wherein R' is a hydrogen atom or a monovalent hydrocarbon radical,
and
D is

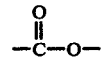

group provided that only one of E and D is connected to T via the carbon atom of the carbonyl group present in D and E, and the compound contains at least one chain having at least five carbon atoms, a process for the manufacture of the said dispersing agents, and their use in the preparation of finely divided dispersions of solids in organic liquids.

11 Claims, No Drawings

DISPERSION OF PIGMENT OR DYESTUFF IN ORGANIC LIQUID

This is a continuation of application Ser. No. 531,787, filed Dec. 11, 1974, now U.S. Pat. No. 4,042,413; which is a division of application Ser. No. 330,882 filed Feb. 8, 1973, now abandoned.

This invention relates to dispersing agents which are especially valuable for the production of dispersions of solids, in particular pigments or dyestuffs, in organic liquids.

According to the invention there are provided as dispersing agents the adducts of one or more compounds from each of the following classes:
(a) an organic compound containing two or more isocyanate groups,
(b) an organic compound containing two or more groups which are reactive with isocyanate groups, and
(c) a compound of the formula:

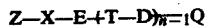

wherein Z represents —OH or —NHR, wherein R is a monovalent hydrocarbon radical;
X is an optionally substituted divalent hydrocarbon radical;
T is a divalent hydrocarbon radical;
n is a positive integer;
Q is an optionally substituted monovalent hydrocarbon radical;
and E is a

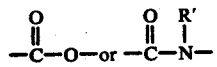

group wherein R' is a hydrogen atom or a monovalent hydrocarbon radical, and D is a

group provided that only one of E and D is connected to T via the carbon atom of the carbonyl group present in D and E, and the compound contains at least one chain having at least five carbon atoms.

The optionally substituted divalent hydrocarbon radical represented by X is preferably a divalent aliphatic hydrocarbon radical or a halogeno substituted derivative thereof such as ethylene, trimethylene and (chloromethyl)ethylene, but more particularly X is a divalent aliphatic radical having a chain of at least 10 carbon atoms which contains a terminal —CH$_2$— group through which X is connected to E, such as

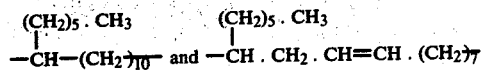

Preferably X is connected to the carbon atom of the carbonyl group present in E via a terminal —CH$_2$— group in the divalent hydrocarbon radical.

The divalent hydrocarbon radical represented by T is preferably a divalent aliphatic hydrocarbon radical such as ethylene or trimethylene, but more particularly such a radical having a chain of at least 10 carbon atoms, for example a radical of the formula:

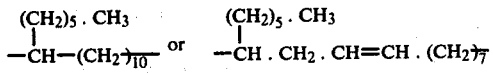

Preferably T is connected to the carbon atom of the carbonyl group present in D or E through a terminal —CH$_2$— group in the divalent hydrocarbon radical.

The monovalent hydrocarbon radicals represented by R and R' are preferably alkyl or alkenyl radicals such as ethyl and allyl radicals, but more especially alkyl and alkenyl radicals containing at least 8 carbon atoms such as octyl, decyl, dodecyl, hexadecyl, octadecyl and octadecenyl.

Preferably n is an integer not exceeding 8, and, above all, n is 1.

The optionally substituted monovalent hydrocarbon radicals represented by Q are preferably optionally substituted monovalent aliphatic radicals in particular optionally substituted alkyl or alkenyl radicals such as ethyl, allyl, β-butoxyethyl, 11-hydroxyheptadecyl and 11-hydroxyheptadecenyl. It is however preferred that Q is an unsubstituted alkyl or alkenyl radical in particular such radicals containing at least 12 carbon atoms such as dodecyl, hexadecyl, heptadecyl, octadecyl, hexadecenyl, heptadecenyl and octadecenyl.

The compound (c) contains at least one chain having at least 5 carbon atoms, and preferably it contains two or more such chains; in particular it is preferred that such chains contain ten or more carbon atoms. Further, whilst such chains can contain ethylenic double bonds there should preferably not be such an accumulation of such bonds as confers drying oil properties on the compound.

The organic compound (b) which contains two or more groups which are reactive with isocyanate groups is preferably an organic compound which contains two or more hydroxy and/or primary or secondary amino groups which are reactive with isocyanate groups.

According to a further feature of the invention there is provided a process for the manufacture of the said dispersing agents which comprises reacting together (a) an organic compound containing two or more isocyanate groups, (b) an organic compound containing two or more groups which are reactive with isocyanate groups, and (c) a compound of the formula:

wherein Z, X, E, T, D, Q and n have the meanings stated.

In carrying out this reaction instead of using a single compound from each of the three classes (a), (b) and (c), mixtures of two or more compounds from one or more of these classes can in fact be used.

The reaction products of (a), (b), and (c) contain urethane, urea, allophanate and/or biuret groups these being formed by reaction of the isocyanate groups present in (a) with the hydroxy and/or amino groups present in (b) and (c). The compound containing the isocyanate groups (a) can be reacted simultaneously with the compounds (b) and (c), or the compound (a) can be reacted with (b), compound (c) added and the reaction completed. It is however preferred to react compound (a) with compound (c) and then to react with compound (b) using an amount of compound (b) which is at least equivalent to the free isocyanate groups present in the initial adduct of (a) and (c). If the final adduct of (a), (b) and (c) still contains free isocyanate groups then these are preferably destroyed by reaction with a monoalcohol such as methanol or a mono- amine such as ethylamine.

In carrying out the reaction it is preferred to use from 1 to 10, and especially from 1½ to 3, molecules of the polyisocyanate for each molecule of compound (c); the usage of compound (b) then corresponding at least to the free isocyanate groups present in the initial reaction product of (a) and (c). The reaction is preferably carried out in the presence of a catalyst for isocyanate reactions, such as diazabicyclooctane.

The reaction can be conveniently carried out in the presence of an inert organic solvent, such as acetone or a hydrocarbon liquid such as a petroleum fraction, the reaction preferably being carried out at a temperature between 40° C. and the boiling point of the reaction medium. At the conclusion of the reaction the inert organic solvent can be removed in conventional manner, for example by distillation, but if desired the resulting solution of the adduct in the inert organic solvent can be used directly in the preparation of dispersions.

The compounds (a) may be any aliphatic or cycloaliphatic compounds containing two or more isocyanate groups such as hexamethylene diisocyanate and isophorene diisocyanate, but are preferably aromatic polyisocyanates such as 4:4'-diisocyanatodiphenylmethane, 2:4-diisocyanatotoluene and 2:6-diisocyanatotoluene, and especially commercially available mixtures of 2:4- and 2:6-diisocyanatotoluene.

The compounds (b) which contain two or more groups which react with isocyanate groups are preferably organic compounds which contain at least two hydroxy and/or primary or secondary amino groups. Such compounds include trimethylolpropane, diethanolamine and triethanolamine, but the preferred compounds are those containing two such groups. Such compounds include aliphatic diols for example ethylene glycol, propylene glycol, butane 1:3- or 1:4-diol, 1:5-pentanediol, 1:6-hexanediol and 1:10-decanediol. Other compounds of this preferred class include aliphatic diamines such as ethylenediamine, 1.3-propylenediamine, hexamethylenediamine and commercially available amines of the formula VNH(CH$_2$)$_3$NH$_2$ where V is a long chain fatty radical, such as that derived from tallow. Other compounds include aminoalcohols such as ethanolamine and β-hexadecylaminoethanol, diols containing ether groups such as diethyleneglycol, triethyleneglycol, polyethyleneglycol and dipropyleneglycol, and adducts of ethylene oxide with aliphatic primary amines, for example an adduct of two molecular proportions of ethylene oxide with one molecular proportion of a fatty amine derived from coconut oil which is commercially available as Ethomeen C/12. Preferred compounds (b) are aliphatic diols containing at least 5 carbon atoms and especially polymethylene glycols containing from 5 to 10 carbon atoms.

The compounds (c) wherein Z is hydroxy, E is

and D is

can be obtained by polycondensation of a hydroxyacid, such as hydroxystearic acid, in the presence of an alcohol of the formula Q—OH.

The compounds (c) wherein Z is hydroxy, E is

and n is 1 can be obtained by esterifying a hydroxyacid such as hydroxystearic acid, with an alcohol Q—OH.

The compounds (c) wherein E is

and D is

can be made by heating an amine of the formula Z—X—NHR' with an acid of the formula

The compounds (c) wherein Z is hydroxy, X contains two carbon atoms between Z and E, E is

and D is

can be obtained by heating an acid of the formula:

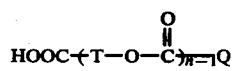

with the appropriate epoxy compound in the presence of a basic catalyst.

The compounds (c) wherein Z is hydroxy, E is

and n is 1 can be obtained by heating a hydroxyacid of the formula: HO—X—COOH with an amine of the formula

The compounds (c) wherein Z is —NHR, E is and D is

can be obtained by heating the hydrochloride of an amine of the formula RNH—X—OH with an acid chloride of the formula:

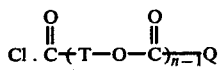

in the presence of p-toluenesulphonic acid and subsequently converting to the free amino compound.

In carrying out the above reactions which involve the formation of polyhydroxy esters an alkyl titanate is often used as a catalyst for the reaction. The presence of alkyl titanate in the resulting compounds can give rise to complications during the subsequent reactions with the polyisocyanate (a). Whilst the catalyst can be removed from the polyhydroxy esters this is frequently a complicated procedure which adds considerably to the cost of the final product. It has however been found that when using reactants (c) which contain alkyl titanates any undesirable side effects can be obviated by carrying out the condensation of (a), (b) and (c) in the presence of a small amount of acetylacetone and/or benzoyl chloride as an inhibitor for the alkyl titanate.

The dispersing agents of the invention are of value for preparing dispersions of solids, especially pigments, or dyestuffs in organic liquids.

According to a further feature of the invention there are provided finely divided dispersions of solids, especially pigments or dyestuffs, in organic liquids which contain dissolved therein a dispersing agent comprising an adduct of (a), (b) and (c).

The said dispersions can be obtained by any of the conventional and well known methods of preparing dispersions. Thus the solid, the organic liquid and the dispersing agent may be mixed in any order and the mixture then subjected to a mechanical treatment to reduce the particle size of the solid, for example by ball milling, bead milling or gravel milling until the dispersion is formed. Preferably the mechanical treatment is carried out until the particle size of the solid, is less than 20 microns and preferably less than 10 microns.

If desired the dispersion can contain other substances, such as zinc rosinate or natural or synthetic resins, which are conventionally present in dispersions of pigments or dyestuffs in organic liquids.

Alternatively, the solid can be treated to reduce its particle size independently or in admixture with either the organic liquid or dispersing agent, and the other ingredient or ingredients then added following which dispersion can be obtained by stirring the mixture. As a further alternative an organic liquid solution of the dispersing agent can be emulsified into an aqueous phase by known means, such as high speed stirring, in the presence of one or more surface active agents, and the resulting emulsion added to an aqueous slurry of the solid, after which the organic liquid and the water are removed by filtration and drying of the residue of pigment or dyestuff and dispersing agent. This residue can be subsequently dispersed in an organic medium. Compositions obtained in this way and comprising the solid in finely divided form and the dispersing agent are a further feature of the invention.

It is preferred that the amount of dispersing agent in the dispersions is such as corresponds to between 5 and 100% by weight, and preferably between 10 and 30%, based on the weight of the solid, and the dispersions preferably contain from 5 to 70% by weight of the solid based on the total weight of the dispersion.

The organic liquids used to prepare the said dispersions can be any inert organic liquid in which the said dispersing agents are at least partly soluble at ambient temperatures and which are stable under the subsequent conditions of usage of the dispersion. If desired mixtures of organic liquids can be used. Preferred organic liquids are hydrocarbons and halogenated hydrocarbons such as benzene, toluene, xylene, white spirit, n-hexane, cyclohexane, chlorobenzene, carbon tetrachloride, and perchloroethylene. Other organic liquids can however be used, for example esters such as dialkyl phthalates, alkyd resins and heat bodied linseed oils used as lithographic varnish media. Above all it is preferred that the organic liquid is a predominantly aliphatic petroleum fraction. In general, the organic liquids or mixtures thereof used to prepare the dispersions will depend on the subsequent uses to which the dispersions are to be put.

The pigments can be either inorganic or organic pigments, and can be of any of the recognised classes of pigments. As examples of inorganic pigments there may be mentioned zinc oxide, Prussian Blue, cadmium sulphide, iron oxides, vermillion, ultramarine and chrome pigments including chromates of lead, zinc, barium and calcium and the various mixtures and modifications thereof such as are commercially available as greenish-yellow to red pigments under the name primrose, lemon, middle, orange, scarlet and red chromes.

As examples of organic pigments there may be mentioned pigments of the azo, thioindigo, anthraquinone, anthanthrone, isodibenzanthrone or triphendioxazine series, vat dye pigments, phthalocyanine pigments such as copper phthalocyanine and its nuclear halogenated derivatives and copper tetraphenyl and octaphenyl phthalocyanines, quinacridone pigments and lakes of acid, basic and mordant dyestuffs. Such pigments are described in, for example, the 3rd Edition of the Colour Index which was published in 1971 under the heading "Pigments" and in subsequent authorised amendments thereto. Preferred pigments are copper phthalocyanine and its nuclear halogenated derivatives. When the pigment is β-form copper phthalocyanine it may be the normal pigmentary form of the copper phthalocyanine or it may be crude copper phthalocyanine.

The dispersing agents of the invention are particularly valuable for the preparation of pigmentary dispersions of copper phthalocyanine directly from crude copper phthalocyanine.

The dyestuffs can be any of the recognised classes of dyestuffs such as are described in for example the 3rd Edition of the Colour Index. A preferred class of dyestuffs comprises Disperse Dyestuffs, the resulting dispersions being of value for the production of printed paper which is to be used in the process of transfer colour printing.

The dispersions of the invention are fluid or semi-fluid compositions containing the pigment or dyestuff in finely divided and deflocculated form, and can be used for any purpose for which dispersions of these particular solids are conventionally used. Thus the dispersions are of particular value in the manufacture of printing inks, by incorporating the dispersions with the other components conventionally used in the manufacture of such inks. The pigment dispersions are especially of value in the manufacture of paints, for which purpose the dispersions are incorporated into conventional alkyd or other resins, as there is improved resistance to flocculation in the presence of titanium dioxide.

The invention is illustrated but not limited by the following Examples in which the parts and percentages are by weight:

In the Examples all references to tolylene diisocyanate denote the commercially available mixture containing 80% of the 2:4-isomer and 20% of the 2:6-isomer. Unless otherwise stated the petroleum fraction is one boiling at 100° to 120° C.

Hydroxyester A

A mixture of 631 parts of a fatty alcohol containing 27% of hexadecanol and 73% of octadecanol, 685 parts of a commercial grade of 12-hydroxystearic acid (having acid and hydroxy values of 182 mg KOH/g and 160 mg KOH/g respectively) and 0.24 part of tetrabutyltitanate is heated for 5 hours at 190° to 200° C., the water formed in the reaction being removed by a stream of nitrogen. On cooling a wax is obtained. This has an acid value of 0.23 mg KOH/g.

Hydroxyester B

A mixture of 270 parts of a commercially available straight chain primary fatty alcohol containing 6.9% hydroxy groups, 730 parts of a commercial grade of 12-hydroxystearic acid and 2 parts of tetrabutyl titanate is heated for 6 hours at 190° to 200° C., the water formed in the reaction being removed in a stream of nitrogen. On cooling a wax is obtained. This has an acid value of 0.95 mg KOH/g and the hydroxyl content is 1.37%.

Hydroxyester C

A mixture of 1635 parts of a commercially available straight chain primary fatty alcohol containing 6.9% hydroxy groups, 1775 parts of a commercial grade of 12-hydroxystearic acid and 5.5 parts of tetrabutyl titanate is heated for 6 hours at 190° to 200° C., the water formed in the reaction being removed in a stream of nitrogen. On cooling a wax is obtained. This has an acid value of 0.15 mg KOH/g and the hydroxyl content is 2.88%.

Hydroxyester D

A mixture of 810 parts of a commercially available straight chain primary fatty alcohol containing 6.9% hydroxy groups, 690 parts of a commercial grade of 12-hydroxystearic acid and 2.5 parts of tetrabutyltitanate is heated for 6 hours at 190° C. to 200° C., the water formed being removed in a stream of nitrogen. The resulting waxy solid has an acid value of 0.2 mg KOH/g and a hydroxyl content of 3.26%.

Hydroxyamide E

A mixture of 462 parts of a commercial grade of 12-hydroxystearic acid, 585 parts of dilaurylamine which is commercially available as Armeen 2C (Armour Hess Chemicals Ltd.) and 65 parts of toluene is stirred for 19 hours at 190° to 200° C. under an atmosphere of nitrogen, the water formed in the reaction being separated from the toluene in the distillate which is then returned to the reaction medium. The toluene is then removed by distillation. The product is a viscous liquid at 50° C. which partially solidifies on further cooling. The acid value is 2.8 mg KOH/g and the infrared spectrum shows a band at 1645 cm$^{-1}$ due to the presence of an amide group.

Hydroxyester F

A mixture of 225 parts of a carboxyl terminated polyester obtained by heating a commercial grade of 12-hydroxystearic acid at 190° to 200° C. in the presence of tetrabutyl titanate until the acid value is 26.6 mg/KOH/g, 0.5 part of dodecyldimethylamine and 11.8 parts of epichlorohydrin is stirred at 150° to 155° C. for 3 hours. The acid value of the resulting product is zero and the product is virtually free from unreacted epichlorohydrin.

Hydroxyester G

A mixture of 298 parts of ricinoleic acid, 306 parts of oleyl alcohol, 0.12 part of tetrabutyl titanate and 35 parts of toluene is stirred for 19 hours at 190° to 200° C. under an atmosphere of nitrogen, the water formed in the reaction being separated from the toluene in the distillate which is then returned to the reaction medium. The toluene is then removed by distillation. The resulting product is a pale amber coloured liquid of zero acid value.

Aminoamido Polyester H

A mixture of 3 parts of a carboxyl terminated polyester prepared by heating a commercial grade of 12-hydroxystearic acid at 190° to 200° C. in the presence of 0.19% of tetrabutyl titanate until the acid value is 35.0 mg KOH/g and 1 part of a fatty diamine of the formula RNH(CH$_2$)$_3$NH$_2$ wherein R is a fatty radical derived from tallow (which is commercially available as Duomeen T) is stirred for 6 hours at 160° C. in a stream of nitrogen. The resulting waxy product has an equivalent of 1455 when titrated with perchloric acid, and infrared spectrum shows bands at 3310, 1645 and 1550 cm$^{-1}$ due to the CONH group.

EXAMPLE 1

A mixture of 30.4 parts of tolylene diisocyanate, 0.006 part of benzoyl chloride, and 0.7 part of a petroleum fraction is stirred at 55° C. whilst an intimate mixture of 51.8 parts of Hydroxyester A and 0.2 part of acetylacetone is added. The temperature is raised to 110° C. and maintained for 1 hour. (At this stage the isocyanate content of the mixture is 11.7% NCO groups). The mixture is cooled to 50° C., 40 parts of acetone, 15.3 parts of 1:6-hexanediol and 0.1 part of diazabicyclooctane are added and the mixture stirred for 1 hour at the boil under a reflux condenser. 0.8 part of methanol is added and the mixture stirred at the boil under reflux for a further 2 hours. 22 Parts of a petroleum fraction are added, and the mixture is then distilled whilst keeping the volume constant by addition of further amounts of the petroleum fraction until the temperature of the vapour reaches 101° C. The residue is then diluted with the petroleum fraction giving a 49.4% solution of the product.

The infra-red spectrum shows the presence of bands at 3320, 1730, 1530, 1230 and 1070 cm$^{-1}$ due to the presence of urethane groups.

EXAMPLE 2

The procedure of Example 1 is repeated except that the usage of 1:6-hexanediol is reduced to 13.65 parts, this being equivalent to the isocyanate groups present at the end of the first stage. A 48.3% solution of the product in the petroleum fraction is obtained.

EXAMPLE 3

Example 1 is repeated except that the following quantities of reactants are used:
  18.2 parts of tolylene diisocyanate
  0.006 part of benzoyl chloride
  64.6 parts of Hydroxyester B
  1.08 parts of acetylacetone
  40 parts of acetone
  9.2 parts of 1:6-hexanediol
  0.1 part of diazabicyclooctane
  0.8 part of methanol
A 57.8% solution of the product in the petroleum fraction is obtained.

EXAMPLE 4

In place of the 15.3 parts of 1:6-hexanediol used in Example 1 there are used 22.5 parts of 1:10-decanediol. A 55.5% solution of the product in the petroleum fraction is obtained.

EXAMPLE 5

The procedure of Example 1 is repeated except that 69.03 parts (instead of 51.8 parts) of Hydroxyester A are used, 0.27 part (instead of 0.2 part) of acetylacetone, and 13.6 parts (instead of 15.3 parts) of 1:6-hexanediol. A 53.8% solution of the adduct is obtained.

EXAMPLE 6

51.8 Parts of Hydroxyester C are gradually added to 30.4 parts of tolylenediisocyanate at 55° C., and the mixture is then stirred for 1 hour at 110° C. The mixture is cooled to 50° C., and a solution of 17.4 parts of dipropylene glycol in 59 parts of acetone added followed by a solution of 0.5 part of diazabicyclooctane in 9.9 parts of acetone. The mixture is stirred for 30 minutes at 55° C., and the mixture is then distilled until the temperature of the vapour reaches 101° C. whilst maintaining the volume constant by addition of the petroleum fraction. The mixture is then diluted with the petroleum fraction to give a 37.7% solution of the product.

The procedure of Example 6 is repeated except that the 17.4 parts of dipropyleneglycol are replaced by the following:
(a) 13.8 parts of diethyleneglycol
(b) 25.9 parts of polyethyleneglycol of M.W. 200
(c) 36.9 parts of an adduct of two molecular proportions of ethylene glycol with one molecular proportion of a fatty primary amine derived from coconut oil, which is commercially available as Ethomeen C/12.
(d) 11.66 parts of 1:4-butanediol
(e) 11.66 parts of 1:3-butanediol
(f) 13.5 parts of 1:5-pentanediol
(g) 15.3 parts of 1:6-hexanediol

EXAMPLE 7

A mixture of 12.15 parts of tolylenediisocyanate and 32.7 parts of Hydroxyester D is stirred for 1 hour at 110° C. The mixture is cooled to 50° and, 4.1 parts of triethanolamine, 55 parts of acetone and 0.2 part of diazabicyclooctane are added, and the mixture is then heated for 30 minutes at 55° C. The solvent (acetone) is then replaced as described in Example 6. A 53.0% solution of the product in the petroleum fraction is obtained.

A similar product is obtained when the 4.1 parts of triethanolamine are replaced by 5.3 parts of triisopropanolamine.

EXAMPLE 8

A mixture of 30.4 parts of tolylenediisocyanate and 41.0 parts of Hydroxyester D is stirred for 1 hour at 110° C. The mixture is cooled to 50° C., 8.7 parts of ethylenglycol, 48 parts of acetone and 0.5 part of diazabicyclooctane are added, and the mixture stirred for 30 minutes at 55° C. The solvent is then replaced as described in Example 6. A 47.5% solution of the product in the petroleum fraction is obtained.

EXAMPLE 9

A mixture of 30.4 parts of tolylene diisocyanate and 51.8 parts of Hydroxyester C is stirred for 1 hour at 110° C. The mixture is cooled to 50° C. and a warm solution of 48.3 parts of Duomeen T in 195 parts of the petroleum fraction is added when the temperature of the mixture rises to 90° C. The resulting solution contains 40% of the product.

EXAMPLE 10

A mixture of 12.15 parts of tolylenediisocyanate and 41.5 parts of Hydroxyester C is stirred for 1 hour at 110° C. then cooled to 50° C. 32 Parts of acetone and 3.08 parts of trimethylolpropane are added and the mixture stirred at the boil under a reflux condenser for 1 hour. The acetone is then replaced as described in Example 6. A 59.7% solution of the product in the petroleum fraction is obtained.

EXAMPLE 11

A mixture of 30.4 parts of tolylene diisocyanate, 67.5 parts of Hydroxyamide E, 0.006 part of benzoyl chloride and 0.7 part of the petroleum fraction is stirred for 1 hour at 110° C. The mixture is cooled to 50° C., 40 parts of acetone, 15.4 parts of 1:6-hexanediol and 0.1 part of diazabicyclooctane are added and the mixture stirred at the boil under a reflux condenser for 1 hour. 0.8 Part of methanol is added and the mixture stirred at the boil under reflux for a further 2 hours. 22 Parts of the petroleum fraction are added and the mixture distilled as described in Example 6. A 58.1% solution of the product is obtained.

EXAMPLE 12

A solution of 14.8 parts of Hydroxyester F in 20 parts of methylethyl ketone and 0.01 part of diazabicyclooctane are added to a mixture of 5.6 parts of methylethylketone and 2 parts of a commercially available 75% solution in ethylacetate of an adduct from tolylenediisocyanate, glycerol and diethyleneglycol containing 14.1% isocyanate groups, and the resulting mixture is stirred at the boil for 16 hours under reflux. The solvent is then distilled off leaving the product as a viscous liquid. The infra-red spectrum has bands at 3300, 1540, 1235 and 1070 cm$^{-1}$ due to the presence of urethane groups.

EXAMPLE 13

In place of the 51.8 parts of Hydroxyester A used in Example 1 there are used 51.8 parts of Hydroxyester G. A 48.6% solution of the product in the petrolem fraction is obtained.

EXAMPLE 14

A mixture of 29.8 parts of a commercially available 75% solution in ethylacetate of a tolylene diisocyanate/glycerol/diethyleneglycol adduct containing 14.1% isocyanate groups, 40 parts of acetone and 59.2 parts of Hydroxyester D is stirred at 55° C. until a clear solution is obtained. A solution of 0.7 part of diazabicyclooctane in 5.6 parts of acetone is added and the acetone is then removed by distillation whilst the petroleum fraction is added to maintain a constant volume. The resulting solution is then diluted with more of the petroleum fraction to 21.4% strength.

EXAMPLE 15

In place of the 30.4 parts of tolylene diisocyanate used in Example 1 there are used 43.7 parts of 4:4'-diisocyanatodiphenylmethane. A 39.0% solution of the adduct is obtained.

EXAMPLE 16

A solution of 50.7 parts of Aminoamidopolyester H and 6.3 parts of 1:6-hexanediol in 93 parts of acetone at 45° C. is added to 12.15 parts of tolylene diisocyanate followed by 0.1 part of diazabicyclooctane in 4 parts of acetone. The mixture is stirred for 2 hours at the boil under reflux, 22 parts of the petroleum fraction are added and distillation are dilution are then carried out as described in Example 1. A 38.3% solution of the product in the petroleum fraction is obtained.

EXAMPLE 17

A mixture of 30.4 parts of tolylene diisocyanate, 51.8 parts of Hydroxyester A and 0.2 part of acetylacetone is stirred for 1 hour at 110° C. The mixture is cooled to 50° C., 40 parts of acetone, 15.3 parts of 1:6-hexanediol and 0.1 part of diazabicyclooctane are added, and the mixture stirred for 1 hour at the boil under reflux. 0.8 Part of methanol is added and the mixture boiled under reflux for a further 2 hours. The mixture is cooled and diluted with acetone giving a 50% solution of the product.

EXAMPLE 18

A mixture of 33.6 parts of isophorone diisocyanate, 46.6 parts of Hydroxyester A and 0.16 part of acetylacetone is stirred for 1 hour at 110° C. (The product then contains 11.35% of free NCO groups). To 61.7 parts of this mixture are added 40 parts of acetone, 11 parts of 1:6-hexanediol and 0.1 part of diazabicyclooctane, and the mixture is stirred for 16 hours at the boil under reflux. 22 Parts of the petroleum fraction are added and the mixture distilled as described in Example 1. A 52.9% solution of the product is obtained.

EXAMPLE 19

A mixture of 26 parts of hexamethylene diisocyanate, 46.5 parts of Hydroxyester A and 0.16 part of acetylacetone is stirred for 1 hour at 110° C. The mixture is cooled to 75° C., 109 parts of the petroleum fraction added, the mixture cooled to 50° C. then added to a solution of 43 parts of Duomeen T in 64.6 parts of the petroleum fraction at 50° C. The temperature rises to 78° C. and is maintained for 10 minutes. A 40% solution of the product is obtained.

EXAMPLE 20

A mixture of 3 parts of β-form copper phthalocyanine, 1.215 parts of the 49.4% solution of the product of Example 1 and 5.785 parts of the petroleum fraction is ball milled for 16 hours to give a finely divided and well deflocculated dispersion of the pigment which is suitable for use in a gravure printing ink.

The following Table gives further Examples of dispersions of the invention which are obtained by milling together 3 parts of the pigment listed in Column 2 of the Table, the agent and the actual amount thereof (weight % based on the weight of the pigment) listed in Column 3 of the Table and sufficient of the organic liquids listed in Column 4 of the Table to bring the total weight of the three components together with the amount of solvent in the solution of the agent to 10 parts. (Note that in Example 51 the amount of perchloroethylene used was increased to give a total weight of 13 parts because of the high density of this liquid).

| EXAMPLE | PIGMENT | AGENT AND AMOUNT THEREOF | ORGANIC LIQUID |
|---|---|---|---|
| 21 | β-form copper phthalocyanine | 20% of the agent of Example 2 | Petroleum Fraction |
| 22 | " | 30% of the agent of Example 3 | " |
| 23 | " | 20% of the agent of Example 4 | " |
| 24 | " | 20% of the agent of Example 5 | " |
| 25 | " | 20% of the agent of Example 6 | " |
| 26 | " | 20% of the agent of Example 6a | " |
| 27 | " | 20% of the agent of Example 6b | " |
| 28 | " | 20% of the agent of Example 6c | " |
| 29 | " | 20% of the agent of Example 6d | " |
| 30 | " | 20% of the agent of Example 6e | " |
| 31 | " | 20% of the agent of Example 6g | " |
| 32 | " | 50% of the agent | " |

-continued

| EXAMPLE | PIGMENT | AGENT AND AMOUNT THEREOF | ORGANIC LIQUID |
|---|---|---|---|
| 33 | " | 50% of the second agent of Example 7 | " |
| 34 | " | 50% of the agent of Example 8 | " |
| 35 | " | 20% of the agent of Example 9 | " |
| 36 | " | 20% of the agent of Example 10 | " |
| 37 | Rosinated calcium toner of 1-(2'-sulpho-4'-methylphenylazo)-2-naphthol-3-carboxylic acid | 20% of the agent of Example 6g | " |
| 38 | Lead sulphochromate | 20% of the agent of Example 6g | " |
| 39 | the phosphomolybdo-tungstate of CI Basic Blue 4 (42595) | 20% of the agent of Example 6g | " |
| 40 | aluminum lake of 1:4-dihydroxy-anthraquinone-2-sulphonic acid | 20% of the agent of Example 6g | " |
| 41 | copper polychloro-phthalocyanine | 20% of the agent of Example 6g | " |
| 42 | 4:10-dibromo-anthanthrone | 20% of the agent of Example 6g | " |
| 43 | indanthrone | 20% of the agent of Example 6g | " |
| 44 | nickel trace of 3-(4'-chlorophenylazo)quin-oline-2:4-diol | 20% of the agent of Example 6g | " |
| 45 | the pigment obtained by coupling tetrazo-tised 3:3'-dichloro-benzidine on to acetoacetanilide | 20% of the agent of Example 6g | " |
| 46 | 8:18-dichloro-5:15-diethyl-di-indolo (3:2-b:3':2'-m)-5:15-dihydrotriphen-dioxazine | 20% of the agent of Example 6g | Petroleum Fraction |
| 47 | β-form copper phthalocyanine | 50% of the agent of Example 6g | Hexane |
| 48 | " | 50% of the agent of Example 6g | Cyclo-hexane |
| 49 | " | 50% of the agent of Example 6g | Xylene |
| 50 | " | 50% of the agent of Example 6g | A dialkyl phthalate derived from a synthetic $C_7$-$C_9$ aliphatic alcohol |
| 51 | " | 50% of the agent of Example 6g | perchloro-ethylene |
| 52 | " | 100% of the agent of Example 11 | petroleum fraction |
| 53 | " | 20% of the agent of Example 11 | " |
| 54 | " | 25% of the agent of Example 12 | " |
| 55 | " | 20% of the agent of Example 13 | " |
| 56 | " | 50% of the agent of Example 14 | " |
| 57 | " | 50% of the agent of Example 15 | " |
| 58 | " | 50% of the agent of Example 16 | " |
| 59 | " | 30% of the agent of Example 6f | " |
| 60 | " | 50% of the agent of Example 18 | " |
| 61 | " | 50% of the agent of Example 19 | " |

EXAMPLE 62

A mixture of 1 part of 1:5-dihydroxy-4:8-diamino-2-(p-hydroxyphenyl)-6-methylanthraquinone, 0.8 part of the 62.4% solution of the agent of Example 6f and 8.2 parts of the petroleum fraction is ball milled for 16 hours to give a deflocculated dispersion of the dyestuff suitable for use for the solvent dyeing of aromatic polyester textile materials.

EXAMPLE 63

A mixture of 64 parts of crude (i.e. non pigmentary) copper phthalocyanine, 16 parts of zinc rosinate, 32.4 parts of the 49.4% solution of the agent of Example 1 and 87.6 parts of the petroleum fraction is ball milled to give a deflocculated dispersion of the copper phthalocyanine containing no particles greater than $3\mu$ and the majority being less than $1\mu$.

This dispersion is suitable for use in gravure printing inks and shows increased strength compared with conventional dispersions of $\beta$-form copper phthalocyanine.

EXAMPLE 64

A mixture of 64 parts of crude copper phthalocyanine, 32.4 parts of the 49.4% solution of the agent of Example 1 and 103.6 parts of a petroleum fraction boiling at 140° to 165° C. is ball milled to give a deflocculated dispersion having no pigment particles greater than $3\mu$ and the majority less than $1\mu$.

This dispersion is suitable for use in an alkyd/melamine formaldehyde stoving medium and shows increased strength and greenness compared with conventional dispersions of $\beta$-form copper phthalocyanine.

EXAMPLE 65

A mixture of 50 parts of a methylated 1:5-diamino-4:8-dihydroxyanthraquinone, 25 parts of the 49.4% solution of the agent of Example 1 and 125 parts of the petroleum fraction is ball-milled to give a fluid deflocculated dispersion of the dyestuff having no particles greater than $3\mu$ and the majority less than $1\mu$.

This dispersion is suitable for use in gravure and rotary screen printing inks particularly for printing paper to give transfer papers suitable for application to polyester textile materials by the transfer printing process.

EXAMPLE 66

A mixture of 2 parts of $\beta$-form copper phthalocyanine pigment, 1.0 part of the 49.4% solution of the dispersing agent of Example 1 and 7.0 parts of a 20% solution of a long oil, linseed oil modified alkyd resin containing pentaerythritol in white spirit is shaken vigorously for 45 minutes with 50 parts of 3 mm glass beads in a Red Devil Paint Conditioner. The resulting millbase is then diluted with 19 parts of a 56% solution of the modified alkyd resin in white spirit.

1.33 Parts of the resulting stainer are mixed with 10 parts of white paint until homogenous and the paint applied to a white card. The paint prepared in this way shows increased tinctorial strength, flocculation resistance and brightness compared with a paint which was similarly prepared except that the 1.0 part of the solution of the agent of Example 1 was omitted when preparing the stainer.

A similar result is obtained if the $\alpha$-form of a partially chlorinated copper phthalocyanine is used as the pigment.

EXAMPLE 67

0.25 Part of an adduct of 3.5 mols of ethylene oxide with 1 mol of an oleyl/cetyl alcohol mixture are added to 10 parts of the 50% solution of the agent of Example 17 and the mixture is poured into 100 parts of a 2.5% aqueous solution of an adduct of 8 mols of ethylene oxide with 1 mol of nonyl phenol with vigorous agitation. The resulting mixture is added to a rapidly stirred slurry of 25 parts of $\beta$-form copper phthalocyanine pigment in 225 parts of water, and the resulting pigment suspension is then filtered off and dried.

When the resulting pigment is incorporated into paint the product shows improved tinctorial strength, flocculation resistance and brightness compared with a similar paint which had been prepared from a pigment which did not include the agent of Example 17.

The pigment of this Example also shows improved strength and brightness when incorporated into a viscous ink medium.

We claim:

1. Compositions of matter comprising a finely divided dispersion containing between 5 and 70% by weight based on the total weight of the composition of a solid dyestuff or pigment in an inert liquid hydrocarbon or an inert chlorinated hydrocarbon containing dissolved therein between 5% and 100% by weight based on the weight of the pigment or dyestuff of a dispersing agent which is an adduct of one or more compounds from each of the following classes:

(a) a polyisocyanate selected from the group consisting of 4:4'-diisocyanatodiphenylmethane, 2:4-diisocyanatotoluene, 2:6-diisocyanatotoluene and mixtures of 2:4- and 2:6-diisocyanatotoluene;

(b) an aliphatic diol containing from 5 to 10 carbon atoms; and (c) a compound of the formula:

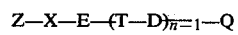

wherein Z represents —OH or —NHR, wherein R is alkyl or alkenyl containing up to 18 carbon atoms;

X is divalent aliphatic hydrocarbon, or a chloro substituent thereof, containing up to 17 carbon atoms;

T is divalent aliphatic hydrocarbon containing up to 17 carbon atoms;

n is a positive integer from 1 to 8;

Q is alkyl or alkenyl containing up to 18 carbon atoms or a hydroxy substituent thereof;

E is

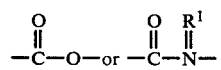

wherein $R^1$ is hydrogen or R; and

D is

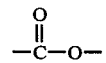

provided that only one of E and D is connected to T via the carbon atom of the carbonyl group present in E and D and that at least one of the groups represented by X, T, Q, R & $R^1$ contains a carbon chain having from 5 to 18 carbon atoms.

2. Compositions of matter as claimed in claim 1 wherein the particle of the solid is less than 20 microns.

3. Compositions of matter as claimed in claim 1 wherein the solid is a dyestuff.

4. Compositions of matter as claimed in claim 3 wherein the dyestuff is a disperse dyestuff.

5. Compositions of matter as claimed in claim 1 wherein the solid is an inorganic pigment.

6. Compositions of matter as claimed in claim 1 wherein the solid is an organic pigment.

7. Compositions of matter as claimed in claim 6 wherein the organic pigment as a phthalocyanine pigment.

8. Compositions of matter as claimed in claim 1 wherein R contains at least 8 carbons.

9. Compositions of matter as claimed in claim 1 wherein X and T contain at least 10 carbon atoms.

10. Compositions of matter as claimed in claim 1 wherein Q has at least 12 carbon atoms.

11. Compositions of matter comprising a finely divided dispersion containing between 5 and 70% by weight based on the total weight of the compositions of a solid dyestuff or pigment in an inert liquid hydrocarbon or an inert chlorinated hydrocarbon containing dissolved therein between 5% and 100% by weight based on the weight of the pigment or dyestuff of a dispersing agent which is an adduct of one or more compounds from each of the following classes:

(a) a polyisocyanate selected from the group consisting of 4:4'-diisocyanatodiphenylmethane, 2:4-diisocyanatotoluene, 2:6-diisocyanatotoluene and mixtures of 2:4- and 2:6-diisocyanatotoluene;

(b) an aliphatic diol containing from 5 to 10 carbon atoms; and (c) a compound of the formula:

Z—X—E—Q wherein Z represents —OH;

X is a divalent aliphatic hydrocarbon, or a chloro substituent thereof, containing from 10 to 17 carbon atoms;

Q is alkyl or alkenyl containing from 12 to 18 carbon atoms or a hydroxy substituent thereof; and E is $$-\overset{O}{\underset{\|}{C}}-O-$$

* * * * *